(12) United States Patent
Yamamoto et al.

(10) Patent No.: US 7,009,352 B2
(45) Date of Patent: Mar. 7, 2006

(54) POWER-WINDOW JAMMING PREVENTING APPARATUS

(75) Inventors: Susumu Yamamoto, Haibara-gun (JP); Yasuyuki Mochizuki, Haibara-gun (JP); Yuichi Nakazawa, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 48 days.

(21) Appl. No.: 10/933,526

(22) Filed: Sep. 3, 2004

(65) Prior Publication Data

US 2005/0083004 A1 Apr. 21, 2005

(30) Foreign Application Priority Data

Sep. 5, 2003 (JP) .................................... P.2003-314266

(51) Int. Cl.
*H02P 3/00* (2006.01)

(52) U.S. Cl. ...................... 318/466; 318/280; 318/283; 318/432; 318/434; 49/26; 49/28

(58) Field of Classification Search ......... 318/280–283, 318/466, 468, 469, 432, 434; 49/26, 28
See application file for complete search history.

(56) References Cited

U.S. PATENT DOCUMENTS

| | | | | |
|---|---|---|---|---|
| 5,559,375 A | * | 9/1996 | Jo et al. ................... | 307/10.1 |
| 5,729,104 A | * | 3/1998 | Kamishima et al. ........ | 318/446 |
| 5,734,245 A | * | 3/1998 | Terashima et al. .......... | 318/453 |
| 5,977,732 A | * | 11/1999 | Matsumoto .................. | 318/283 |
| 6,051,945 A | * | 4/2000 | Furukawa ................... | 318/280 |
| 6,359,408 B1 | * | 3/2002 | Tyckowski .................. | 318/469 |
| 6,548,979 B1 | * | 4/2003 | Boisvert et al. ............ | 318/469 |
| 6,867,563 B1 | * | 3/2005 | Ohshima .................... | 318/434 |

FOREIGN PATENT DOCUMENTS

JP    2002-295129 A    10/2002

* cited by examiner

*Primary Examiner*—Rina Duda
(74) *Attorney, Agent, or Firm*—Sughrue Mion, PLLC

(57) ABSTRACT

A current sensing circuit includes; a shunt resistor, on which a motor current is flown; a reference resistor which has a resistance value that is n times the shunt resistor; and a current following circuit. The current following circuit includes: a following current control circuit, which controls the following current and generates a first reference voltage; and a capacitor which generates a second reference voltage indicating an average value of the first reference voltage. A first comparator compares a third reference voltage higher than the first reference voltage with the second reference voltage, and outputs the current limitation control signal. A motor current sensing range expanding circuit expands a motor current sensing range by increasing a ratio of the current sensing circuit having the shunt resistor and the reference resistor.

3 Claims, 8 Drawing Sheets

POWER-WINDOW JAMMING PREVENTING APPARATUS

BACKGROUND OF THE INVENTION

The present invention relates to an apparatus for preventing a jamming of a foreign matter (e.g., finger, neck, or the like of the passenger) in a power window of a vehicle and, more particularly, improvement in a power-window jamming preventing apparatus for determining quickly a jamming of a foreign matter without error.

An apparatus for automatically opening/closing a window glass of a vehicle is normally called a power window, and is an apparatus that opens/closes the window glass by a motor. A power-window jamming preventing apparatus is employed to provide the jamming protection to the power window as the countermeasure to prevent the jamming of the foreign matter in the window glass. In the normal power-window jamming preventing apparatus, the load applied to the jammed foreign matter is extremely increased because of an increase of the motor current when the jamming of the foreign matter occurs during the lifting of the window glass, and therefore the motor current must be limited to suppress such increase of this motor current.

Therefore, the power-window jamming preventing apparatus improved to take account of the above circumstances were proposed (for example, see JP-A-2002-295129).

In the description in the following drawings, the same or like symbols are affixed to the same or functionally like portions.

The power-window jamming preventing apparatus proposed in JP-A-2002-295129 will be explained in detail with reference to the accompanying drawings hereunder.

(Outline of the Power-Window Jamming Preventing Apparatus)

FIG. 5 is a block diagram of an example of the power-window jamming preventing apparatus proposed in JP-A-2002-295129. This power-window jamming preventing apparatus has an abnormal current (generated by a jamming, or the like) sensing circuit 2, a power window motor 5 having a forwarding/reversing circuit, a jamming determining circuit 6, and a motor current limiting circuit 7. In this case, the power window motor 5 having the forwarding/reversing circuit may be considered as the forwarding/reversing circuit 5 containing the power window motor. Three circuits of the current sensing circuit 2, the forwarding/reversing circuit 5, and the current limiting circuit 7 are connected in series with an electric wire 1 through which a motor current ID flows, and are connected to a power supply device VB.

(Out Line of the Abnormal Current (Generated by the Jamming, or the Like) Sensing Circuit 2)

The current sensing circuit 2 senses an abnormal current generated in the motor current ID by the jamming, or the like, and then outputs an abnormal current sensing signal (current limitation control signal) to the current limiting circuit 7 via a signal line 9. The current sensing circuit 2 has a multi-source field effect transistor (FET) or a multi resistor, a current following circuit 3, and a starting circuit 4.

The multi-source FET is composed of a main FET and a reference FET. Also, the multi resistor is composed of a shunt resistor and a reference resistor. A current sensing ratio n of the multi-source FET or the multi resistor, i.e., a resistance component ratio of the reference resistor to the main resistor, for example, is set in excess of 1, preferably set to 100 or more. The motor current ID is supplied to the main FET or the shunt resistor. Then, a reference current Iref is controlled in such a manner that the reference current Iref that satisfies a condition of ID=n*Iref flows through the reference FET or the reference resistor.

In the case where the main FET or the shunt resistor is present on the high side of the motor (the power supply side with respect to the motor), a source potential of the main FET or a motor-side potential VSA of the shunt resistor and a source potential of the reference FET or a ground-side potential VSB of the reference resistor must be set to satisfy a condition of VSA=VSB so as to satisfy the above condition ID=n*Iref. If the motor current ID is changed owing to change in a driving force of the window glass when the motor is normally running, the source potential VSA of the main FET, etc. are also changed, but the condition of VSA=VSB is maintained by controlling the reference current Iref.

Next, a method of sensing the abnormal current generated by the jamming, or the like will be explained hereunder.

The reference current Iref is classified into two current components each having a different following speed. The reference current Iref is classified into a current component Iref-s having a slow following speed and a current component Iref-f having a fast following speed. The current component Iref-s having a slow following speed is set such that such component follows the change in the motor current ID when the motor is normally running but cannot follow sudden change of the motor current ID when the jamming occurs. In contrast, the current component Iref-f having a fast following speed is set such that such component can follow not only change in the current when the jamming occurs but also a ripple component contained in the motor current ID. If the following characteristic of the current component Iref-f having a fast following speed is improved more and more, the current component Iref-s having a slow following speed is not needed to change and is stabilized. In order to satisfy such condition, the following speed of the current component Iref-f having a fast following speed is set 800 to 1000 times quicker than the current component Iref-s having a slow following speed.

When setting in this manner, the current component Iref-f having a fast following speed reflects exactly the change in the motor current ID except the ON/OFF operation of the semiconductor switching element. The change in the motor current ID is converted into a voltage by passing the current component Iref-f having a fast following speed through a resistor having a resistance value larger than the reference resistor. An amplified variation of an infinitesimal variation obtained by converting the change in the motor current ID into a voltage via an ON resistance of the shunt resistor or the main FET can be sensed by the conversion of this voltage.

When the jamming occurs, the current component Iref-f having a fast following speed is increased to follow the motor current ID, while the current component Iref-s having a slow following speed is seldom changed. As a result, a difference is generated between an average value of the current component Iref-f having a fast following speed and the current component Iref-s having a slow following speed, and thus a magnitude relationship of (average value of Iref-f)>(Iref-s) is derived. If this magnitude difference exceeds a previously set value, the abnormal current sensing signal is generated and then the multi-source FET placed on the high side of the motor or the semiconductor switching element (the FET or the bipolar transistor) in the current limiting circuit 7 placed on the low side of the motor is turned off.

Then, the multi-source FET or the semiconductor switching element placed on the low side of the motor execute the operation to repeat the ON/OFF operation and the continuous ON operation during when the jamming occurs. Although explained in detail hereunder, the increase of the motor current ID can be limited by the operation to repeat the ON/OFF operation and the continuous ON operation.

(Outline of the Motor Current Limiting Circuit 7)

The current limiting circuit 7, when receives the abnormal current sensing signal, limits the current not to increase the motor current ID. This limitation is executed by causing the multi-source FET or the semiconductor switching element placed on the low side of the motor to repeat alternately the ON/OFF operation and the continuous ON operation. The operation signal to repeat the ON/OFF operation and the continuous ON operation is output to-the jamming determining circuit 6 via a signal line 10. The current limiting circuit 7 has the semiconductor switching element such as FET, or the like for ON/OFF-controlling the motor current ID, and a reference voltage circuit 8 for generating an ON reference voltage and an OFF reference voltage of the semiconductor switching element.

When the motor current ID enters into the repeating operation of the ON/OFF operation and the continuous ON operation, such motor current ID is limited to keep an average value at a value that is slightly larger than a value obtained immediately before the jamming occurs. A motor torque is in proportion to the motor current, and accordingly the motor torque is kept at a torque that is slightly larger than a torque required for the drive of the window glass. If such required minimum torque is ensured, the minimum jamming load can be realized under the condition that the false reversion is not caused even though a glass driving force is momentarily varied due to the rough road, or the like.

(Outline of the Jamming Determining Circuit 6)

The jamming determining circuit 6 determines whether or not the jamming occurred, based on the input operation signal to repeat the ON/OFF operation and the continuous ON operation. The jamming determining circuit 6, when determines that the jamming occurred, outputs a window-down signal to the effect that the window glass is opened to the forwarding/reversing circuit 5 via a signal line 11.

In the determination of the jamming, such an event is utilized that a period of the ON/OFF operation of the semiconductor switching element is prolonged and a period of the continuous ON operation of the semiconductor switching element is shortened while the number of revolution of the motor is lowered owing to the jamming. For example, when the period of the ON/OFF operation comes up to a predetermined length, it is decided that the jamming occurred. When the occurrence of the jamming is determined, the motor 5 is stopped by shutting off the multi-source FET or the semiconductor switching element, and then the motor 5 is reversed/driven after a predetermined time lapsed. Accordingly, the window glass is opened and the inserted foreign matter can be prevented from being jammed.

(Outline of the Power-Window Motor 5 having the Forwarding/Reversing Circuit)

The forwarding/reversing circuit 5 runs the motor in the direction to close the window glass by inputting a window-up signal, and runs the motor in the direction to open the window glass by inputting a window-down signal. Also, the forwarding/reversing circuit 5, when receives the window-down signal via the signal line 11, inverts the revolution of the motor from the direction to close the window glass to the direction to open the window glass. The forwarding/reversing circuit 5 has an H-bridge circuit or a relay circuit. When the H-bridge circuit is used, four FETs to constitute or connect the H-bridge circuit are used. The current sensing circuit 2 and the current limiting circuit 7 may be constructed by using the transistor on the high side out of four FETs, or the current sensing circuit 2 may be constructed by using the transistor on the high side and the current limiting circuit 7 may be constructed by using the transistor on the low side.

FIGS. 4A to 4C show a variation of a block diagram of the power-window jamming preventing apparatus. More particularly, the current sensing circuit 2 is connected to a plus terminal of the power supply device VB or a ground that is equivalent to a minus terminal, and the sequence in which the motor current ID is supplied to the forwarding/reversing circuit 5 and the current limiting circuit 7 may be set arbitrarily. More particularly, the sequence like the current sensing circuit 2→the current limiting circuit 7→the forwarding/reversing circuit 5, as shown in FIG. 6A, the sequence like the current sensing circuit 2→the forwarding/reversing circuit 5→the current limiting circuit 7 (i.e., the same sequence as shown in FIG. 5), as shown in FIG. 6B, the sequence like the forwarding/reversing circuit 5→the current limiting circuit 7→the current sensing circuit 2, as shown in FIG. 6C, and others may be selected. It may be concluded that no large difference of the action and the effect of the power-window jamming preventing apparatus is caused because of the difference of the sequence.

FIG. 7 shows an example of a circuit diagram of the power-window jamming preventing apparatus. The circuit configurations and the circuit operations of the current sensing circuit 2, the current limiting circuit 7, and the jamming determining circuit 6 in the power-window jamming preventing apparatus will be explained in detail herein.

1. Explanation of the Current Sensing Circuit 2

1—1. Circuit Configuration of the Current Sensing Circuit 2

A circuit for classifying the reference current Iref into two current components Iref-s and Iref-f each having the different following speed by using the shunt resistor and the reference resistor to sense the abnormal current will be explained hereunder.

The current sensing circuit 2 in FIG. 7 has a shunt resistor R1 and a reference resistor R20 both connected to the plus terminal of the power supply device VB, a current following circuit 3 connected to the resistors R1 and R20, a comparator CMP2 whose plus input terminal and minus input terminal are connected to the current following circuit 3 and whose output terminal is connected to the current limiting circuit 7, and a resistor R25 connected between a 5V power supply and the output terminal of CMP2.

The current following circuit 3 has a comparator CMP1 whose plus input terminal is connected to the reference resistor R20 and whose minus input terminal is connected to the shunt resistor R1, a first charging/discharging circuit constructed by connecting a resistor R21 and a grounded capacitor C1 in series and connected to an output terminal of CMP1, a second charging/discharging circuit constructed by connecting a resistor R22 and a grounded capacitor C2 in series and connected to the output terminal of CMP1, a resistor R28 connected between the capacitors C1 and C2, an nMOSFET (T21) whose drain terminal is connected to the plus input terminal of CMP1 and whose gate terminal is connected to the capacitor C1, a first source follower circuit constructed by a resistor R23 whose one end is connected to a source terminal of FET (T21) and the plus input terminal of CMP 2 and whose the other end is grounded, an nMOS- FET (T22) whose drain terminal is connected to the plus input terminal of CMP1 and whose gate terminal is connected to the capacitor C1, a diode D21 whose anode terminal is connected to a source terminal of FET (T22), and a second source follower circuit constructed by a resistor R24 whose one end is connected to a cathode terminal of the diode D21 and the minus input terminal of CMP 2 and whose the other end is grounded.

In this case, 910K labeled to the resistor R21, etc. in FIG. 7 denotes that a resistance value of the resistor R21 is 910 KΩ. Similarly, 0.1 uf labeled to the capacitor C2, etc. denotes that a capacitance value of the capacitor C2 is 0.1 µF.

1-2. Explanation of an Operation of the Current Sensing Circuit 2

In FIG. 7, the shunt resistor R1, the forwarding/reversing circuit 5, and a semiconductor switching element (FET) T1 used to execute the ON/OFF operation are connected in series with the electric wire 1, through which the motor current ID flows, and connected between the plus terminal and the minus terminal of the power supply device (e.g., battery) VB. Forwarding/reversing relays in the forwarding/reversing circuit 5 are driven by transistors T2 and T3 respectively, and T2 is turned ON in the forwarding (up) operation while T3 is turned ON in the reversing (down) operation. The multi resistor is composed of the shunt resistor R1 and the reference resistor R20. In the circuit example in FIG. 7, a resistance value of R1 is set to 34 mΩ, and a resistance value of R20 is set to 55 Ω. The motor current ID flows through the shunt resistor R1 and the reference current Iref flows through the reference resistor R20. For convenience of explanation, the resistance value of the resistor R1, the capacitance value of the capacitor C2, and others are represented by the same symbol R1 as the resistor R1, and others. Thus, the current ratio n to satisfy the condition of R1*ID=R20*Iref is given by Eq. (1).

$$n = ID/Iref = R20/R1 = 55/0.034 = 1618 \qquad \text{Eq. (1)}$$

The comparator CMP1 consists of an OP amplifier, and a motor-side potential of the shunt resistor R1 is input into the minus input terminal of CMP1 and a ground-side potential of the reference resistor R20 is input into the plus input terminal of CMP1. The first charging/discharging circuit constructed by connecting the resistor R21 and the capacitor C1 in series is connected to between the output of CMP1 and a ground potential level (GND), and the capacitor C1 is charged/discharged by an output (charge/discharge control signal CMP1_OUT) of CMP1 via the resistor R21. The non-grounded side of the capacitor C1 is connected to the gate terminal of FET T21, the drain terminal of FET T21 is connected to the reference resistor R20, and the source terminal of FET T21 is grounded via the resistor R23. Since FET T21 and the resistor R20 constitute the first source follower circuit, a current that is proportional to a potential of the capacitor C1 flows through FET T21 and the resistor R20. This current serves as the current component Iref-s having a slow following speed in the reference current Iref.

In contrast, the second charging/discharging circuit constructed by connecting the resistor R22 and the capacitor C2 in series is connected to between the output of CMP1 and the ground potential level (GND), and the capacitor C2 is charged/discharged by the output of CMP1 via the resistor R22. The non-grounded side of the capacitor C2 is connected to the gate terminal of FET T22, the drain terminal of FET T22 is connected to the reference resistor R20, and the source terminal of FET T22 is grounded via the resistor R24. Since FET T22, the diode D21, and the resistor R24 constitute the second source follower circuit, a current that is proportional to a potential of the capacitor C2 flows through FET T22, the diode D21, and the resistor R24. This current serves as the current component Iref-f having a fast following speed in the reference current Iref. The non-grounded sides of the capacitors C1 and C2 are connected via the resistor R28, so that potentials of the capacitors C1 and C2 are made equal to each other when the motor current ID is not changed. In other words, two charging/discharging circuits consisting of the capacitors C1, C2 and the resistors R21, R22 are connected in parallel to the output of the comparator CMP1, and two source follower circuits that flow the current in proportion to the potentials of respective capacitors C1 and C2 are connected in parallel between the reference resistor R20 and the ground. A time constant of the first charging/discharging circuit is set larger than that of the second charging/discharging circuit. In this circuit example, the time constant of the first charging/discharging circuit is given by Eq. (2) and the time constant of the second charging/discharging circuit is given by Eq. (3), and thus a ratio of time constants becomes 1:894.

$$\begin{aligned}\text{(Time constant of the first charging/discharging circuit)} &= R21*(R22+R28)/(R21+R22+R28)*C1 \\ &= 910K*(5.1K+910K)/(910K+5.1K+910K)*1\mu f \\ &= 456\,\text{ms}\end{aligned} \qquad \text{Eq. (2)}$$

$$\begin{aligned}\text{(Time constant of the second charging/discharging circuit)} &= R22*C2 = 5.1K*0.1\mu f = 0.51\,\text{ms}\end{aligned} \qquad \text{Eq. (3)}$$

The jamming is sensed by the comparator CMP2. A source potential of T21 is input into the plus input terminal of CMP2 and a potential that is lower than the source potential of T22 by a forward voltage drop of about 0.7 V in the diode D21 is input into the minus input terminal. Because gate-source potentials of T21 and T22 are almost equal to each other, an amount of the voltage drop in D21 corresponds to a sensed value of the abnormal current that is increased due to the jamming. The current component Iref-f is increased because of the occurrence of the jamming, an output (current-limitation control signal CPOUT_B) of CMP2 is changed from an H level to an L level. Then, an output of a NOR1 in the current limiting circuit 7 is shifted to an H level, a transistor T31 is turned ON, and the transistor T1 as the semiconductor switching element is turned OFF. The abnormal current generated due to the jamming at this time is sensed as follows.

(a) First, the reference current Iref is separated into the current component Iref-s having a slow following speed the current component Iref-f having a fast following speed, as shown in FIG. 7. The change of the motor current ID appears in the Iref-f to contain the ripple component, and is reflected exactly in a source potential of T22, i.e., a voltage (Vins) at the minus input terminal of CMP2. As a result, a source potential of T21 on the Iref-s side, i.e., a voltage (Vc) at the plus input terminal of CMP2 is not subjected to the influence of a fast variation of the motor current ID, and reflects only an average value taken over a long period. Therefore, the above potential is kept at an almost constant potential while the current limitation is being carried out after the jamming occurred, whereby the ideal reference voltage can be realized.

(b) A variation component caused by the ripple component of the motor current is contained in the current component Iref-f having a fast following speed. Assume that an amplitude of the ripple current is $\Delta$ID-rip and the ripple component of the Iref-f is $\Delta$Iref-f-rip, $\Delta$Iref-f-rip=$\Delta$ID-rip/n is satisfied. In the case where R24=1.5K$\Omega$ and $\Delta$ID-rip=0.5 A, a voltage variation $\Delta$Vrip generated in the resistor R24 by $\Delta$Iref-f-rip becomes 0.46 V, as given by Eq. (4).

$$\Delta Vrip = \Delta Iref\text{-}f\text{-}rip * R24 \qquad \text{Eq. (4)}$$
$$= \Delta ID\text{-}rip/n * R24$$
$$= 0.5A/1618 * 1.5K$$
$$= 0.46 \text{ V}$$

That is, the voltage at the minus input terminal of CMP2 is oscillated by the ripple component at an amplitude ±0.23V (±$\Delta$Vrip/2). Therefore, the output of CMP2 is inverted from the H level to the L level when the average value of the Iref-f is increased by 0.47V (=0.7V–0.23V).

This 0.47V is calculated as 0.51 A (=0.47V/R24*n= 0.47V/1.5K* 1618) in terms of the motor current ID. That is, in the circuit example in FIG. 7, when the average value of the motor ID is increased by 0.51 A due to the jamming, the output of CMP2 is shifted to the L level and then T31 is turned ON and T1 goes to its OFF state.

(c) As shown in FIGS. 8A to 8C, since the motor current is increased before the output of CMP2 is inverted into the L level (prior to a time t1), the output of CMP2 is at the H level. When T31 is turned ON, the motor current ID start to decrease with delay corresponding to a time during when the charges that are excessively charged in the gate of T1 are discharged. The output of CMP1 starts to shift from the H level to the L level at this point of time. However, since CMP1 is composed of the OP amplifier, a delay time is generated owing to the delayed response of the OP amplifier when such output is changed from the H level to the L level.

Since C2 is charged during a time t1 required until the output of CMP1 is lowered from the H level and becomes equal to the potential of the capacitor C2 after the output of CMP2 is inverted to the L level, the Iref-f is increased and the voltage at the minus input terminal of CMP2 is increased. Then, C2 starts to discharge when the output of CMP1 becomes lower than the potential of C2. The voltage at the minus input terminal of CMP2 goes back to the original voltage, i.e., the voltage at which the output of CMP2 is started to shift from the H level to the L level, after a time t2 required until the discharging of the charges stored for the time t1 is completed. The voltage at the plus input terminal is not changed during this time.

After the time t2 lapsed, the output of CMP2 is inverted to the H level and also FET T1 is turned ON. That is, the output of CMP2 is kept at the L level for a time t1+t2 after the motor current ID is increased and then the output of CMP2 is inverted to the L level. If the potential of C2 is located between the H level and the L level of the output of CMP1, a relationship of t1≈t2 is derived. The time t1+t2 is decided dependent upon a turn-OFF delay time of T1, a response speed of the OP amplifier, and a decreasing rate of the motor current ID. In this case, because the turn-OFF delay time of T1 and the response speed of the OP amplifier are constant, such time t1+t2 depends on the decreasing rate of the motor current ID and becomes longer as the decreasing rate becomes slower.

When the output of CMP2 is shifter again from the L level to the H level and also T1 is turned ON, the motor current ID starts to increase. Therefore, the output of CMP1 goes from the L level to the H level, but C2 is continued to discharge during when the output of CMP1 is lower than the potential of C2. Suppose that a time required until the output of CMP1 becomes equal to the potential of the capacitor C2 after the output of CMP2 is inverted to the H level is a time t3 . When the output of CMP1 exceeds the potential of the capacitor C2, such capacitor C2 is started to charge. When a time t4 required until the charge having the same charge quantity as that being discharged for the time t3 is charged lapsed, the output of CMP2 is inverted to the L level and the T1 is turned OFF. In other words, the output of CMP2 is maintained at the H level for the time t3+t4. The time t3+t4 is decided based on the response speed of the OP amplifier and an increasing rate of the motor current ID. Because the response speed of the OP amplifier is constant, the time t3+t4 depends on the increasing rate of the motor current ID and is shortened smaller as the increasing rate is accelerated.

(d) The reason why the forward voltage drop of the diode D21 is used to set a jamming sensing value is to keep the jamming sensing value constant even though the motor current ID is changed and thus the average value of the Iref-f is changed. However, since the forward voltage drop of the diode D21 cannot be changed by this method when the jamming sensing value must be changed, such jamming sensing value is changed by adjusting a resistance value of the resistor R24. As understood from the explanation in the item (b), the jamming sensing value becomes small if the value of the resistor R24 is increased whereas the jamming sensing value becomes large if the value of the resistor R24 is decreased conversely.

(e) It is feasible to set the jamming sensing value by using a resistor in place of the diode D21. In this case, when the motor current ID is increased, the jamming sensing value is increased in proportion to this.

2. Explanation of the Current Limiting Circuit 7

2-1. Circuit Configuration of the Current Limiting Circuit 7

The current limiting circuit 7 in FIG. 7 includes a NOR gate NOR1 whose input terminal is connected to the output terminal of CMP2, a comparator CMP3 whose output terminal is connected to the input terminal of NOR1, the reference voltage circuit 8 connected to a minus input terminal of CMP3, the semiconductor switching element T1 whose drain terminal is connected to a plus input terminal of CMP3 and whose source terminal is grounded, a variable resistor R32 connected to a gate terminal of the switching element T1 an FET (T31) whose gate terminal is connected to an output terminal of NOR1, whose drain terminal is connected to the resistor R32, and whose source terminal is grounded, a resistor R31 connected between the plus terminal of the power supply device VB and the drain terminal, a resistor R33 connected between the plus input terminal of CMP3 and the ground, and a resistor R37 connected between the output terminal of CMP3 and the 5V power supply.

The reference voltage circuit 8 has a resistor R35 connected between the minus input terminal of CMP3 and the power supply device VB, a resistor R36 connected between the minus input terminal of CMP3 and the ground, a resistor R34 connected to the minus input terminal of CMP3, a diode D31 whose anode terminal is connected to the resistor R34, and an FET (T32) whose drain terminal is connected to a cathode terminal of the diode D31, whose source terminal is grounded, and whose gate terminal is connected to the output terminal of CMP3.

2—2. Explanation of an Operation of the Current Limiting Circuit 7

The limitation of the motor current ID is carried out by using the current sensing circuit 2 and the current limiting circuit 7 in combination.

At first, the operation of the current limiting circuit 7 will be explained hereunder. When an output of the comparator CMP2 in the current sensing circuit 2 is at the H level, an output of the NOR gate NOR1 becomes the L level, the transistor T31 is turned OFF, and the switching element (transistor) T1 is turned ON. Explanation will be made of the case where T1 is formed of FET. At this time, since the voltage at the plus input terminal of the comparator CMP3 is connected to the drain terminal of T1, the almost ground potential level is input to the terminal. In contrast, the voltage at the minus input terminal of the comparator CMP3 is decided by the reference voltage circuit 8 that consists of R34, R35, R36, the diode D31, and the transistor T32. When R34=3.3KΩ, R35=10KΩ, R36=24KΩ are set and the power supply voltage VB is set to 12.5V, such voltage becomes 8.82V if T32 is turned OFF while such voltage becomes 3.03V if T32 is turned ON. Since the voltage is never lowered smaller than 3.03V in any case, the output of CMP3 is at the L level. Thus, T32 is in its OFF state. When the jamming occurs and the output of the comparator CMP2 goes to the L level, the output of NOR1 goes to the H level, the T31 is turned ON, and the T1 is turned OFF. The drain voltage VDS of the T1 starts to increase from the ground potential level. Since T32 was turned OFF, the voltage at the minus input terminal of the CMP3 is 8.82V. When the drain voltage VDS of T1 goes to 8.82V or more, the output of CMP3 is inverted into the H level, the output of NOR1 goes to the L level, and T31 is turned OFF and T1 is turned ON. At this time, since T32 is also turned ON at the same time, the minus input voltage of CMP3 is lowered to 3.03V. As a result, T1 holds its ON state until the drain voltage VDS is lowered to 3.03V or less once T1 is turned ON. When the drain voltage VDS of T1 is reduced lower than 3.03V, the output of CMP3 goes to the L level once again, T1 is turned OFF and simultaneously T32 is turned OFF, and the minus input terminal of CMP3 is increased up to 8.82V. T1 maintains its OFF state until the drain voltage VDS of T1 exceeds 8.82V. This operation corresponds to one period of the ON/OFF operation, and this state is continued inasmuch as the output of CMP2 is at the L level.

Constancy of the Motor Current in the ON/OFF Operation

Next, the event that the motor current ID is scarcely changed in one period of the ON/OFF operation when the ON/OFF operation is executed will be explained hereunder. A static characteristic curve to which a load line of FET T1 is added is shown in FIG. 9. When the motor is normally running before the jamming occurs, T1 operates at an A point. When the motor load current ID is changed, the operating point moves vertically between the A point and a B point, for example, in the ohmic range. When the jamming occurs, the load current ID of the motor is increased and the operating point of T1 moves upward. When the operating point comes up to the B point, T1 is turned OFF. A current difference between the B point and the A point shows the jamming sensing value. When T1 is turned OFF, the drain-source voltage VDS is extended but the operating point of T1 at that time moves rightward on a horizontal line passing through the B point. In other words, the drain current ID (=the motor load current) keeps as it is the value obtained when T1 is turned OFF and the drain-source voltage VDS of T1 is extended. This is because, when the drain-source voltage VDS of T1 moves between the ground potential level and the power supply voltage, the gate-drain capacitance CGD of T1 is apparently increased by the Miller effect and thus the drain-source voltage VDS is seldom changed.

Miller Effect

FIG. 10 is an equivalent circuit diagram of the switching element T1. Suppose that the drain-source voltage VDS is increased by an infinitesimal voltage ΔVGS based on the charging executed via the gate driver. Accordingly, the motor current ID is increased by ΔID and thus a counter electromotive force Ec (=L*dID/dt) is generated by an inductance L of the motor. A charge ΔQ charged in the gate-drain capacitance-CGD is given by Eq. (5).

$$\Delta Q = CGD*(\Delta VGS + \Delta ID*Ra + Ec)\qquad \text{Eq. (5)}$$

where Ra is an armature resistance. Also, a capacitance Cm of CGD, which is from the gate terminal, is given by Eq. (6).

$$Cm = \Delta Q/\Delta VGS = CGD*(1 + \Delta ID*Ra/\Delta VGS + Ec/\Delta VGS)\qquad \text{Eq. (6)}$$

The capacitance Cm is the "Miller capacitance" and is the apparent capacitance generated by the fact that a voltage change across the capacitance CGD is considerably larger than ΔVGS. When the gate driver charges/discharges the gate charge of FET via the gate resistance RG, the capacitance that can be seen from the driver side is not CGD but Cm. When the inductance L of the motor becomes large, the capacitance Cm has a large value rather than CGD and thus the gate-source voltage VGS is seldom changed even though the gate driver charges/discharges the gate of T1 in the ON/OFF operation. However, the Miller effect is effective only when the drain potential VDS of the main FET (T1) can be changed freely between the ground potential level (GND) and the power supply voltage (VB). At this time, since T1 is in the pinch-off range, ID=Gm*VGS is satisfied where Gm is a transfer conductance of T1. It is appreciated from this Equation that ID is not changed and is kept almost constant if VGS becomes almost constant.

Suppose that, when the transistor T32 is turned ON and OFF in FIG. 7, the voltage at the minus input terminal of the comparator CMP3 is given by VL and VH FIG. 9 respectively. In this circuit example, VL=3.03V and VH=8.82V are given. When the operating point of T1 moves rightward on a horizontal line passing through the B point in FIG. 9 and the drain voltage VDS exceeds the voltage VH, the output of CMP3 goes to the H level and T1 is turned ON. In the actual circuit, because of a delay in the circuit, T1 is turned ON after a while after the drain voltage VDS exceeds VH. In FIG. 9, T1 is turned ON at a C point at which the VDS exceeds 10V, and VDS goes down toward the ground potential level. When VDS is lowered smaller than the voltage VL, the output of CMP3 goes to the L level and T1 is turned OFF once again. In this manner, T1 continues the ON/OFF operation as far as the output of CMP2 is at the L level.

Reduction of ID by the ON/OFF Operation

Next, the event that the drain current ID is reduced gradually during when the ON/OFF operation is continued will be explained hereunder. Since the drain voltage VDS of T1 is restricted by the reference voltages VL and VH when the ON/OFF operation is started, the operating point of T1 oscillates between the C point and the D point in FIG. 9. The average value of VDS at this time is at a G point and is located substantially in the center between the C point and the D point. The G point is the DC-like operation point of T1. In contrast, a line segment CD gives an AC operating curve. In FIG. 9, a straight line a gives a load line of T1 when the motor is stopped in the case where the power supply device VB is set to 12.5V, and a gradient is decided by the armature resistance Ra. Straight lines b to g are in parallel with the straight line a, and their projections onto the axis of abscissa can represent an amount of the voltage drop respectively when the drain current ID (=the motor current) is supplied to the motor.

First, the situation immediately before the jamming occurs will be considered herein. The operation point of T1 at this time exists in the A point. Assume that the counter electromotive force of the motor is Emotor-A and the drain-source voltage is VDSon, Eq. (7) is given as follows.

$$VB = VDSon + Ra*ID + Emotor\text{-}A \qquad \text{Eq. (7)}$$

Next, the situation immediately after the jamming occurs and then the ON/OFF operation is started will be considered herein. ID consists of an AC component IDA that varies in synchronism with the ON/OFF operation, and a DC-like component IDD other than this IDA. That is, ID has a relationship ID=IDA+IDD. A counter electromotive force Eonoff is generated by the inductance of the motor when IDD is changed. A magnitude of the force is calculated by Eq. (8).

$$Eonoff = L*d(IDD)/dt \qquad \text{Eq. (8)}$$

Assume that an average value of the drain-source voltage VDS of T1 in the ON/OFF operation is VDSonoff. This corresponds to the G point in FIG. 9. Suppose that the number of revolution of the motor is not changed in one period of the ON/OFF operation. In addition, since ID is not changed, Eq. (9) is given.

$$VB = VDSonoff + Ra*ID + Emotor\text{-}A + Eonoff \qquad \text{Eq. (9)}$$

Subtracting both sides in Eq. (9) from both sides in Eq. (7) respectively gives Eq. (10).

$$0 = VDSon - VDSonoff - Eonoff$$

$$Eonoff = VDSon - VDSonoff \qquad \text{Eq. (10)}$$

where VDSon is a drain-source voltage in the continuous ON operation and is about 0.3 V, and VDSonoff is the voltage at the G point and is about 6.5 V. Thus, Eonoff has a minus value of −6.2V from Eq. (10). Then, it is seen that IDD is reduced smaller than that in Eq. (8) because Eonoff has the minus value.

Implementation of the Minimum Reversing Load (Prevention of the Malfunction Caused Due to the Rough Road, or the Like)

When the DC-like component of the ID goes down from the operating point G to the operating point H while executing the ON/OFF operation, the Iref-f is reduced to follow IDD. Then, when IDD reaches the H point in FIG. 9, the CMP2 is inverted from the L level to the H level, the operating point of FET T1 moves from the H point to the F point, and T1 enters into its continuous ON state. When T1 is brought into its continuous ON state, ID is increased, the operating point goes to the B point via the A point, and T1 enters into its ON/OFF operation once again. Since Iref-s is not changed for this while, the voltage at the plus input terminal of CMP2 is not changed and thus the A point is fixed and the B to F points are not changed correspondingly. The value of the current ID is restricted within a predetermined range during when the ON/OFF operation and the continuous ON state are repeated.

The average value of the current ID that is restricted within the predetermined range is maintained at the value that is slightly larger than the value of the current ID immediately before the current limiting operation is executed. This condition has two important meanings.

First, a motor torque can be limited within a predetermined range since the motor torque is in proportion to the current. Thus, the jamming load can be limited.

Second, the malfunction such that the motor is reversed although the jamming does not occur during the running on the rough road, or the like can be prevented. When the power window is operated during the running on the rough road, or the like, it is possible that the driving force of the window glass is changed by the vertical motion of the car body and such driving force is increased momentarily, the number of revolution of the motor is lowered correspondingly, ID is increased, T1 is turned OFF, and the current limiting mode is applied. However, since the preceding glass driving force is still maintained even though the current limiting mode is applied, the number of revolution of the motor can be restored into the original state when the increase of the load due to the vertical motion is eliminated, so that the false reversion can be avoided. In this case, the premise that the glass driving force is not changed for this while is needed. Also, this premise can be satisfied in most cases. According to above features, the minimum reversing load can be implemented under the condition that the false reversion is not caused by the momentary increase of the driving force caused due to the rough road, or the like.

Changes in the ON/OFF Operation Period and the Continuous ON Period According to the Reduction in the Number of Revolution of the Motor Next, the case where Eq. (7) and Eq. (9) are generalized will be considered herein. The number of revolution of the motor is lowered when a time lapsed for a while after the jamming occurs. Since the counter electromotive force of the motor is proportional to the number of revolution of the motor, a relationship of Emotor-B<Emotor-A is given if the counter electromotive force of the motor at that time is assumed as Emotor-B shown in FIG. 9. If T1 is brought into the continuous ON state by the counter electromotive force having this lowered number of revolution, i.e., an magnitude of Emotor-B, the increasing rate of the current ID is accelerated unlike the previous state, and thus a counter electromotive force Eon is generated by the inductance L of the motor. Thus, Eon=L*dID/dt is derived. Rewriting Eq. (7) by using Eon, which is not given in Eq. (7), gives Eq. (11).

$$VB = VDSon + Ra*ID + Emotor\text{-}B + Eon \qquad \text{Eq. (11)}$$

Suppose that the number of revolution of the motor in Equation of the ON/OFF operation corresponding to Eq. (11) is not changed in both the continuous ON operation and the ON/OFF operation, replacing the Emotor-A in Eq. (9) with the Emotor-B gives Eq. (12).

$$VB = VDSonoff + Ra*ID + Emotor\text{-}B + Eonoff \quad \text{Eq. (12)}$$

Eq. (13) is derived from Eq. (11) and Eq. (12).

$$Eon\text{-}Eonoff = VDSonoff - VDSon = 6.5V - 0.3V = 6.2V \quad \text{Eq. (13)}$$

Because a sign of Eon is plus and a sign of Eonoff is minus, Eq. (13) signifies that the counter electromotive force Eonoff in the continuous ON operation and the counter electromotive force Eonoff in the ON/OFF operation have an opposite sign respectively and a sum of their absolute values becomes constant and is equal to a difference between respective VDSs, i.e., VDSonoff−VDSon. A difference between VDSs is constant regardless of the number of revolution of the motor. Since Emotor-B becomes small as the number of revolution of the motor is lowered, an absolute value of Eonoff becomes small and an absolute value of Eon becomes large. That is, it is understood that, when the number of revolution of the motor is lowered, the decreasing rate of ID in the ON/OFF operation is lowered and the increasing rate of ID in the continuous ON operation is accelerated.

In addition, as can be seen from FIG. 9, Eonoff obtained when the operation goes out of the ON/OFF operation (H point) (Eonoff-C in FIG. 9) becomes small rather than Eonoff obtained immediately after the operation enters into the ON/OFF operation (G point) (Eonoff-D in FIG. 9). This indicates that a decreasing rate of the current is reduced gradually during the ON/OFF operation period. Also, the state that Eon-E is smaller than Eon-F in FIG. 9 indicates that an increasing rate of the current is reduced gradually during the continuous ON operation period.

Period of the ON/OFF Operation

When T1 is turned ON, the gate charge of T1 is discharged via R32 and the gate-source voltage of T1 starts to reduce. Then, ID starts to reduce because ID=Gm*VGS. The counter electromotive force Ec is generated by the inductance L of the motor owing to the reduction of ID, and the voltage drop due to the armature resistance Ra is reduced though it is small. That is, the voltage drop of the motor is reduced by an amount of drop $\Delta VM$ (=Ec+Ra*$\Delta ID$). Where $\Delta ID$ denotes an amount of reduction of ID. Also, the counter electromotive force Ec can be calculated by Ec=L*$\Delta ID/\Delta t$. In this case, it is assumed that the number of revolution of the motor is not changed during one period of the ON/OFF operation.

The drain voltage VDS of T1 (which is equal to the drain-source voltage because the source is grounded) starts to increase because of an amount of drop $\Delta VM$ of the voltage drop of the motor. The gate-drain voltage of T1 is extended by $\Delta VM$ and the gate-drain capacitance CGD is charged by $\Delta VM$. Since the charge is supplied to the gate by this charging, the gate charge is not reduced even though the charge is discharged via R32. Therefore, the gate-source voltage VGS is substantially scarcely reduced. This is the Miller effect.

Then, VDS is increased if the discharging still continues via R32, and then T1 is turned OFF when VDS exceeds the reference voltage VH. Then, the current flows into the gate of T1 from the power supply voltage VB via the resistors R31 and R32 and thus the gate starts to be charged. When the gate-source voltage VGS starts to increase owing to the charging of the gate, ID increases and the gate charge is absorbed by the Miller effect, as in the case of the discharging of the gate charge. That is, the charges charged via R31 and R32 are canceled by the Miller effect. Then, VDS is lowered when the charging of the gate proceeds, then the output of CMP3 goes to the L level when VDS becomes smaller than the reference voltage VL, and then T1 is brought into its OFF state.

A quantity of charge being supplied/canceled to/from the gate of T1 by the Miller effect is decided by the reference voltages VL and VH, and has a constant amount. A time required by the gate circuit to charge and subsequently discharge this quantity of charge gives one period of the ON/OFF operation. A charging time of the gate is decided by the power supply voltage VB and the gate resistances R31+R32, and a discharging time is decided by the gate resistance R32. That is, the period of the ON/OFF operation is decided by the reference voltages VL and VH, the power supply voltage VB, and the gate resistances R31 and R32. Therefore, the period of the ON/OFF operation can be varied by changing the gate resistances, more particularly the resistance R32.

3. Explanation of the Jamming Determining Circuit 6

3-1. Circuit Configuration of the Jamming Determining Circuit 6

The jamming determining circuit 6 in FIG. 7 has an input terminal that is connected to the output terminal of CMP3 in the current limiting circuit 7, and can be composed of a 16 pulse counter that is reset if it does not count for 80 $\mu$ second.

3-2. Explanation of the Operation of the Jamming Determining Circuit 6

The power-window jamming preventing apparatus senses the jamming by the current sensing circuit 2, then limits the current by the current limiting circuit 7 to keep the motor current ID within the predetermined range, and then determines by the jamming determining circuit 6 whether or not the jamming occurs. A determining method will be explained herein. When the number of revolution of the motor is lowered by the jamming, the ON/OFF operation period of T1 is prolonged while the continuous ON operation period of T1 is shortened. It is determined by utilizing this characteristic whether or not the jamming occurs. There are three following methods as the particular determining method.

(a) The occurrence of the jamming is determined when a ratio of the continuous ON operation period and the ON/OFF operation period reaches a predetermined value while sensing the ratio. The continuous ON operation period and the ON/OFF operation period can be discriminated based on the output of CMP2. The operation is the continuous ON operation when the output of CMP2 is at the H level, and the operation is the ON/OFF operation when the output of CMP2 is at the L level. Therefore, a target ratio can be sensed if the output of CMP2 is averaged as the analog signal.

(b) The occurrence of the jamming is determined when the continuous ON operation period or the ON/OFF operation period reaches a predetermined value while counting the period. The determination is made by counting the H period or the L period of the output of CMP2.

(c) The occurrence of the jamming is determined when an ON/OFF frequency in the ON/OFF operation period reaches a predetermined value while counting the frequency. The leading frequency of the output level of CMP3 is counted, as shown in FIG. 7, and then the occurrence of the jamming is determined when the counted frequency reaches 16 pulses in the example in FIG. 7. In order not to count the frequency in the continuous ON operation period, the counter is reset when the pulse is interrupted for a predetermined period. In the example in FIG. 7, the counter is reset when the output of CMP3 is not changed for 80 $\mu$s. The number of revolution when the occurrence of the jamming is determined is set to a state in which such number of revolution is lowered by about 60% rather than the number of revolution prior to the occurrence of the jamming. This set value is at a level that is not generated by reduction in the number of revolution caused by the impulsive load change that is generated due to the rough road, or the like.

Method of Setting a Jamming Determining Value

A method of setting a jamming determining value is summed up as follows.

(i) A determining value is set at a level that is not generated by reduction in the number of revolution of the motor caused by the impulsive load change that is generated due to the rough road, or the like.

(ii) A continued period of the ON/OFF operation depends on the OFF delay time of T1 and the response characteristic of the OP amplifier used as CMP1. Therefore, the ON/OFF frequency corresponding to the determining value is decided based on standard values of these characteristics as the premise, and then a counter value is set.

(iii) When the determining value must be adjusted because the OFF delay time of T1 and the response characteristic of the OP amplifier are varied, the ON/OFF operation period is changed by varying the gate series resistance of T1 to deal with these variations. Accordingly, the counter value can be fixed even though the OFF delay time of T1 and the response characteristic of the OP amplifier are varied. It is convenient for the case where respective circuits are prepared as IC that the counter value can be fixed.

Change in the Number of Revolution of the Motor in the ON/OFF Operation

Explanation is made of the situation that the ON/OFF operation period is extended but the continuous ON operation period is shortened when the number of revolution of the motor is lowered. This explanation is made based on the assumption. That is, the assumption that the number of revolution of the motor is seldom changed in one period of the ON/OFF operation is made. This assumption is realized by such a method that the motor continues to push the glass with a constant force during the ON/OFF operation. Since the inter-terminal voltage of the motor is given as VB−VDSonoff in the ON/OFF operation, a motor output Pm is given by Eq. (14).

$$Pm = (VB\text{-}VDSonoff) * ID\text{-} Ra * ID2 \qquad \text{Eq. (14)}$$
$$= (VB\text{-}VDSonoff\text{-}Ra * ID) * ID$$
$$= (Emotor\text{-}Eonoff) * ID$$

Followings can be understood by Eq. (14).

(i) In the ON/OFF operation, the almost constant output is output irrespective of the number of revolution of the motor.

(ii) In the ON/OFF operation, the output is lowered by VDSonoff*ID rather than the output in the continuous ON operation.

In other words, the motor outputs the constant output during the ON/OFF operation to drive the window glass. This means the motor continues to push the window glass, and the number of revolution of the motor is always linked with the speed of the window glass. Since the motion of the window glass is slow, such motion is seldom changed within one period of the ON/OFF operation. As a result, the number of revolution of the motor is also seldom changed within one period of the ON/OFF operation, so that the above assumption can be supported.

According to the above power-window jamming preventing apparatus and other embodiments and variations disclosed in JP-A-2002-395129, the motor current can be limited by determining quickly the jamming of the foreign matter without error. However, it is further preferable that the performance of sensing the jamming of a relatively soft foreign matter should be improved in a state that the heavy load is always applied to the window glass because the friction is increased particularly by the low temperature, the aged deterioration, and so on.

SUMMARY OF THE INVENTION

The present invention has been made in light of the above circumstances, and it is an object of the present invention to provide an improved power-window jamming preventing apparatus capable of limiting a motor current by sensing surely an abnormal current caused in a motor current due to a jamming of a foreign matter without error in the power-window jamming preventing apparatus that can sense the jamming of the foreign matter in a window glass based on change in the motor current.

In order to achieve the above object, according to the present invention, there is provided a power-window jamming preventing apparatus, comprising:

a current detecting circuit for detecting an increase in the motor current flowing in a power window motor, a current restricting circuit for reducing and increasing the motor current in a predetermined range in accordance with a current restricting control signal outputted from the current detecting circuit when an amount of increasing the motor current exceeds a predetermined value, and a jamming determining circuit for reversely rotating the power window motor by determining the jamming from an increase in the motor current;

wherein the current detecting circuit includes a shunt resistor which is connected in series with the power window motor and the current restricting circuit and one end of which is connected to a ground terminal of a power supply apparatus for making the motor current flow, a reference resistor which is provided with a resistance value of n times as much as a resistance value of the shunt resistor and one end of which is connected to the ground terminal of the power supply apparatus, and a current followup circuit connected to other end of the reference resistor and connected to other end of the shunt resistor for making a followup current flow to the reference resistor such that voltages respectively applied to the shunt resistor and the reference resistor become always equal to each other;

wherein in the power window jamming preventing apparatus, the current followup circuit includes a followup current control circuit for controlling the followup current made to flow to the reference resistor to be one n-th of the motor current, a first comparator one terminal of which is applied with a first reference voltage generated by the followup current control circuit and including a pulsating component of the motor current, and a charging and discharging circuit including a capacitor connected between other input terminal of the first comparator and a plus terminal of the power supply apparatus for generating a second reference voltage indicating an average value of the first reference voltage by being charged and discharged to apply to the other input terminal of the first comparator, a first current source connected in parallel with the capacitor for charging the capacitor, a first semiconductor switch connected to the first current source for operating On/Off in accordance with an output of the first comparator, and a second current source connected to the first current source via the first semiconductor switch for discharging the capacitor connected between the first semiconductor switch and the ground terminal of the power supply apparatus;

wherein the current detecting circuit further includes a second comparator one input terminal of which is applied with a third reference voltage generated by the followup current control circuit and indicating a predetermined voltage value higher than the first reference voltage, other input terminal of which is applied with the second reference voltage and an output terminal of which outputs the current restricting control signal, further comprising:

a motor current detecting range expanding circuit for expanding a motor current detecting range by increasing a ratio of the current detecting circuit comprising the shunt resistor and the reference resistor when the first reference voltage becomes equal to or lower than a comparing voltage indicating a voltage input range of an active element of the followup current control circuit and when the state continues for a constant period of time.

According to the above configuration, when there is brought about a state in which the window glass is always applied with a heavy load by increasing friction at low temperature time or by an ageing change or the like or a state in which the output voltage of the power supply apparatus VB is lowered and the motor current ID is made to flow more than normal, the first reference voltage becomes equal to or lower than the comparing voltage indicating the voltage input range of the active element of the followup current control circuit and the state continues for a constant period of time, the motor current detecting range expanding circuit expands the motor current detecting range by increasing the ratio of the current detecting circuit comprising the shunt resistor and the reference resistor and therefore, jamming can firmly be detected even at low temperature or at low voltage.

Preferably, the followup current control circuit includes a field effect transistor a potential of a drain terminal of which is made to constitute the first reference voltage and a source terminal of which is connected to other end of the reference resistor, an operational amplifier one input terminal of which is connected to a source terminal of the field effect transistor and an output terminal of which is connected to a gate terminal of the field effect transistor, and a first resistor one end of which is connected to other input terminal of the operational amplifier and other end of which is connected to other end of the shunt resistor;

wherein the motor current detecting range expanding circuit includes a second resistor one end of which is connected to other end of the operational amplifier, a second semiconductor switch interposed between other end of the second resistor and the ground terminal of the power supply apparatus, a third comparator one input end of which is applied with the first reference voltage and other input end of which is applied with a comparing voltage indicating a voltage input range of an active element including the operational amplifier of the followup current control circuit, a digital filter an input side terminal of which is connected to an output end of the third comparator for removing an instantaneous change of an output of the third comparator, and a latch an input side terminal of which is connected to an output side terminal of the digital filter for making the second semiconductor switch On by latching an output of the third comparator outputted from the digital filter when the first reference voltage becomes equal to or lower than the comparing voltage for a constant period of time for expanding a jamming detectable range by increasing the ratio of the current detecting circuit by adding the second resistor to the followup current control circuit by making the second semiconductor switch On.

According to the above configuration, when the reference voltage becomes equal to or lower than the comparing voltage for a constant period of time, the motor current detecting range expanding circuit increases the ratio of the current detecting circuit comprising the shunt resistor and the reference resistor by interposing the second resistor to the followup current control circuit. Thereby, the motor current detecting range is expanded and jamming can be detected firmly even at low temperature time or low voltage time.

As has been explained above, according to the invention, when the motor current is increased by applying the heavy load to the window glass by increasing the friction or lowering the power source voltage to be equal to or lower than the comparing voltage indicating the voltage input range of the active element of the followup current control circuit and the state continues for a constant period of time, the motor current detecting range is expanded by increasing the ratio of the current detecting circuit comprising the shunt resistor and the reference resistor and therefore, jamming can firmly be detected.

According to the present invention, there is also provided a power-window jamming preventing apparatus, comprising;

a current sensing circuit, which senses a motor current flowing through a motor for driving a window glass;

a current limiting circuit, which increases and decreases the motor current based on a current limitation control signal outputted from the current sensing circuit when an amount of increase of the motor current exceeds a predetermined vale; and a jamming determining circuit, which determines a jamming of a foreign matter in the window glass based on increase of the motor current to reverse a rotation of the motor, wherein the current sensing circuit includes;

a shunt resistor, on which the motor current is flown;

a reference resistor, which has a resistance value that is n times the shunt resistor; and a current following circuit, which increases and decreases a following current flowing through the reference resistor so that voltages respectively applied to the shunt resistor and the reference resistor become always equal to each other;

wherein the current following circuit includes:

a following current control circuit, which controls the following current so as to be one n-th of the motor current, and generates a first reference voltage having a pulsating component of the motor current; and a capacitor, which generates a second reference voltage indicating an average value of the first reference voltage by charging and discharging; and wherein the current sensing circuit includes a first comparator which compares a third reference voltage higher than the first reference voltage with the second reference voltage, and outputs the current limitation control signal based on a comparison result thereof, the apparatus further comprising, a motor current sensing range expanding circuit, which expands a motor current sensing range by increasing a ratio of the current sensing circuit having the shunt resistor and the reference resistor when the first reference voltage becomes equal to or lower than a comparing voltage indicating a voltage input range of an active element of the following current control circuit and the state of the first reference voltage and the comparing voltage continues for a constant period of time.

Preferably, the motor current sensing range expanding circuit includes:

a resistor, which is connected to the shunt resistor;

a semiconductor switch, which is connected to the resistor; and a second comparator, which compares the first reference voltage with the comparing voltage;

wherein the semiconductor switch is turned on in accordance with an output of the second comparator when the first reference voltage becomes equal to or lower than the comparing voltage for a constant period of time; and wherein when the semiconductor switch is turned on, the second resistor is added to the following current control circuit so that the ratio of the current detecting circuit is increased by adding of the resistor for expanding a jamming detectable range.

Preferably, the motor current sensing range expanding circuit includes a digital filter, which is provided between the second comparator and the semiconductor switch, and removes an instantaneous change of the output of the second comparator.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A detailed explanation will be given of a preferable embodiment according to the invention in reference to the attaching drawings as follows.

Figure 1:
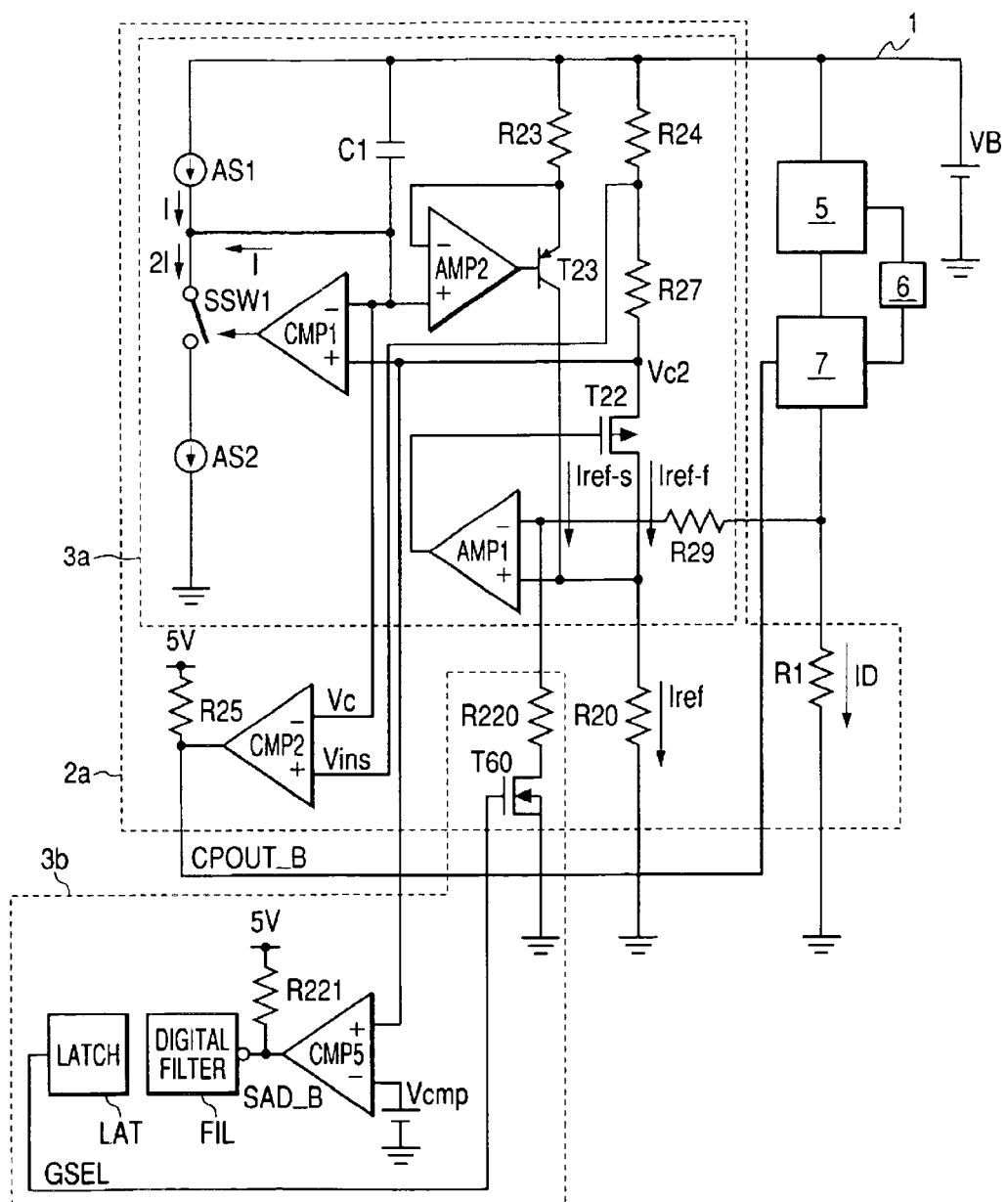
FIG. 1 is a circuit diagram schematically showing a power window jamming preventing apparatus which is an embodiment according to the invention.

FIG. 1 is a schematic diagram schematically showing a power window jamming preventing apparatus which is an embodiment according to the invention.

Figure 5:
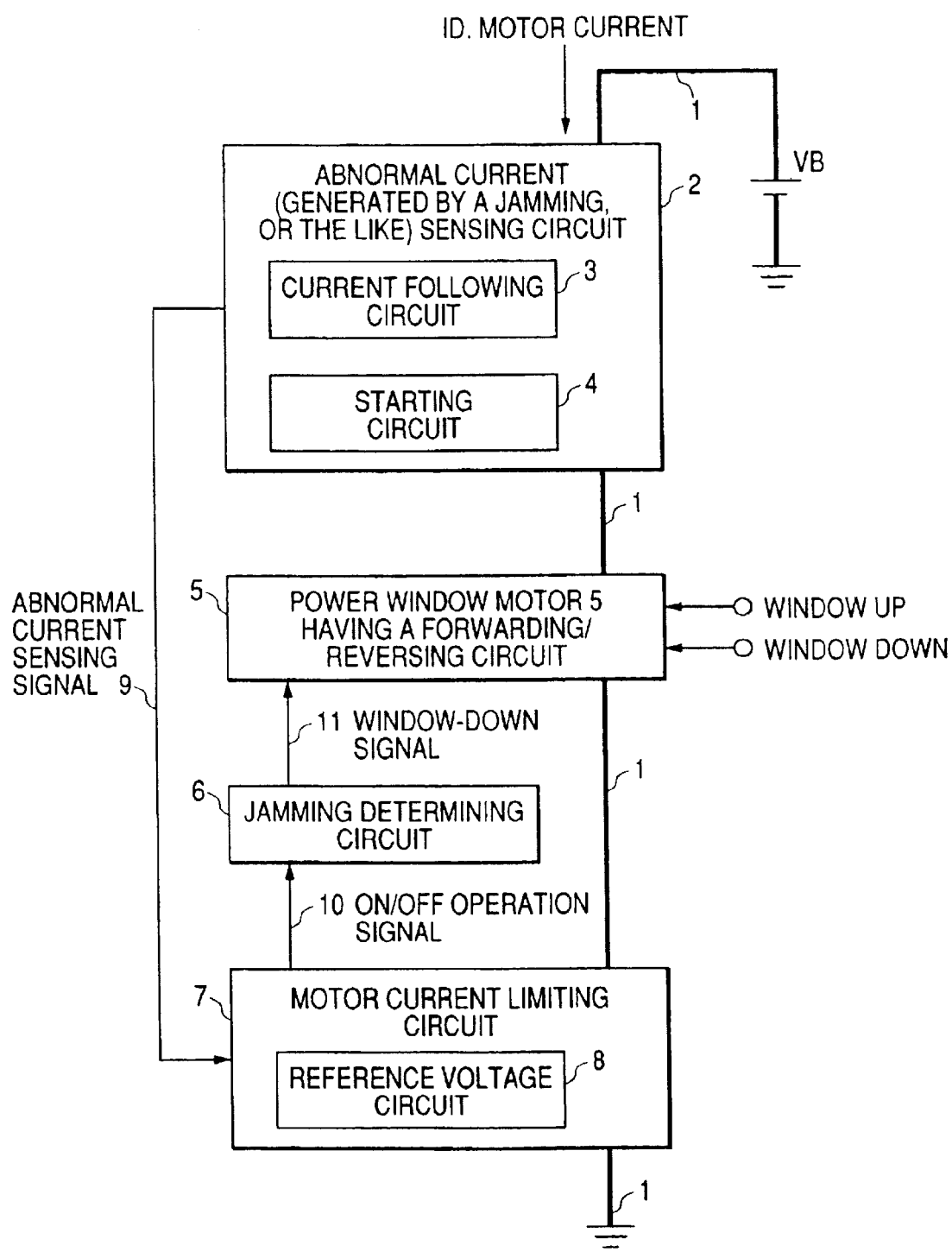
FIG. 5 is a block diagram of a power-window jamming preventing apparatus in the related art.
Figure 6A:
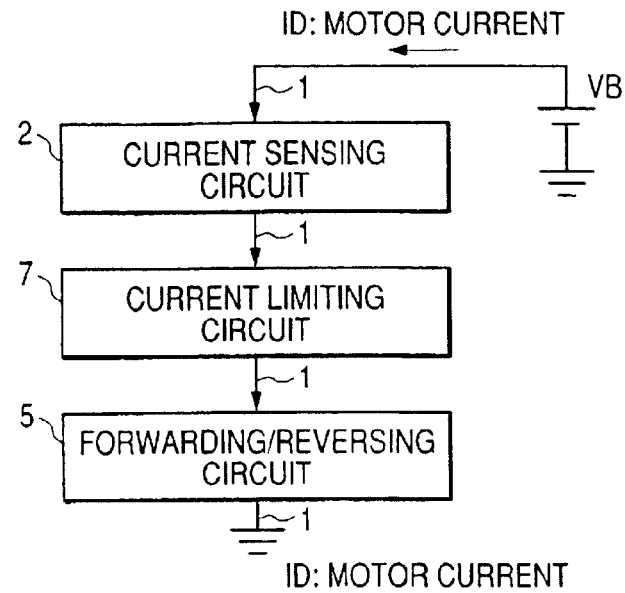
FIGS. 6A to 6C are block diagrams explaining a variation of the power-window jamming preventing apparatus in the related art.
Figure 6B:
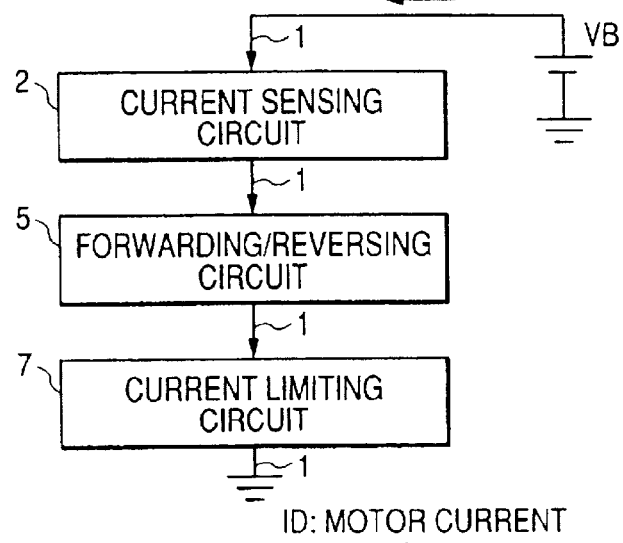
Figure 6C:
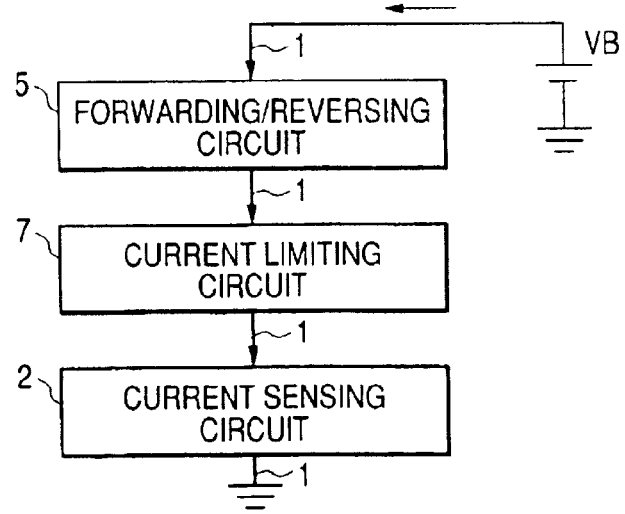
Figure 7:
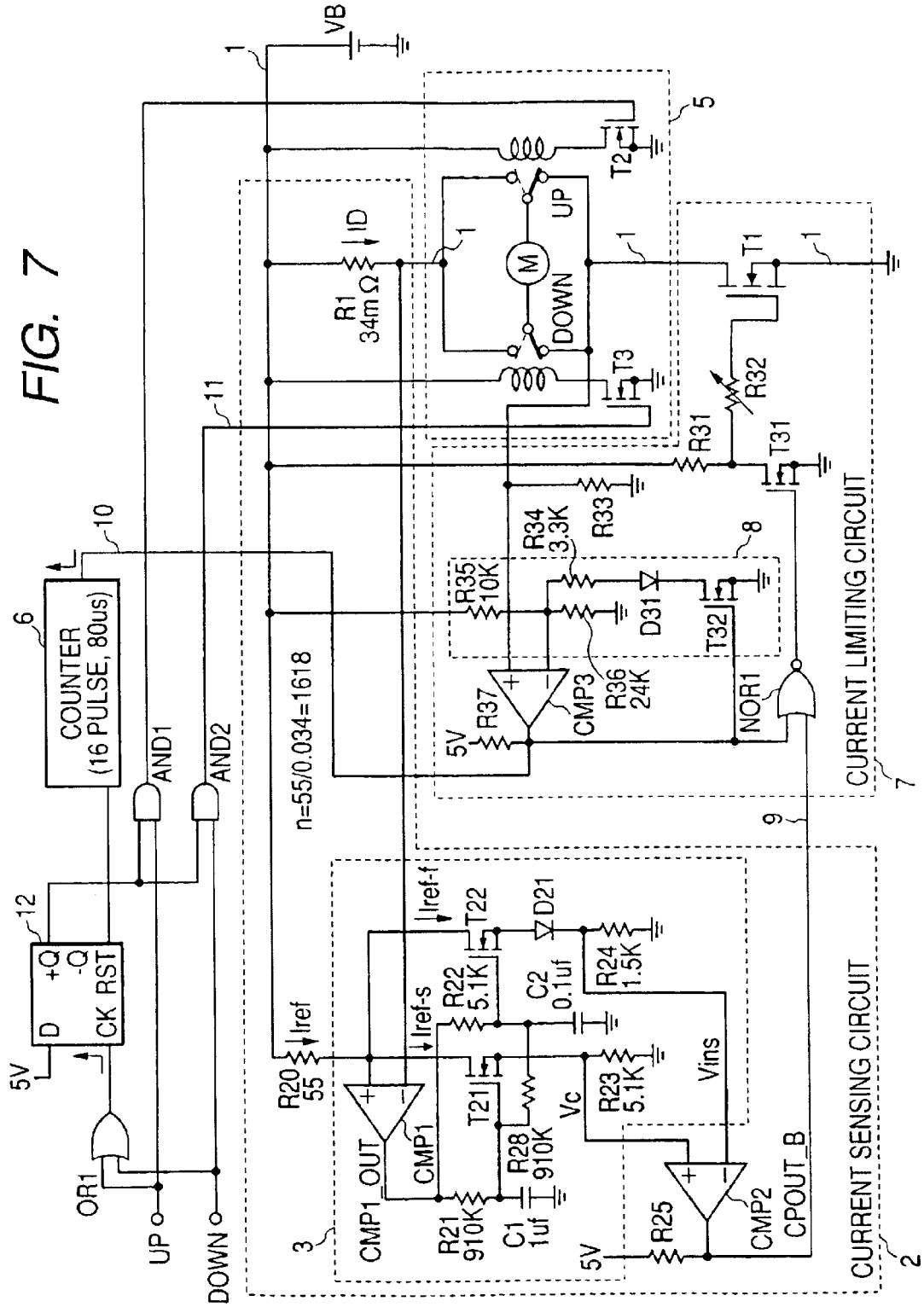
FIG. 7 is a circuit diagram of the power-window jamming preventing apparatus in the related art.
Figure 8A:
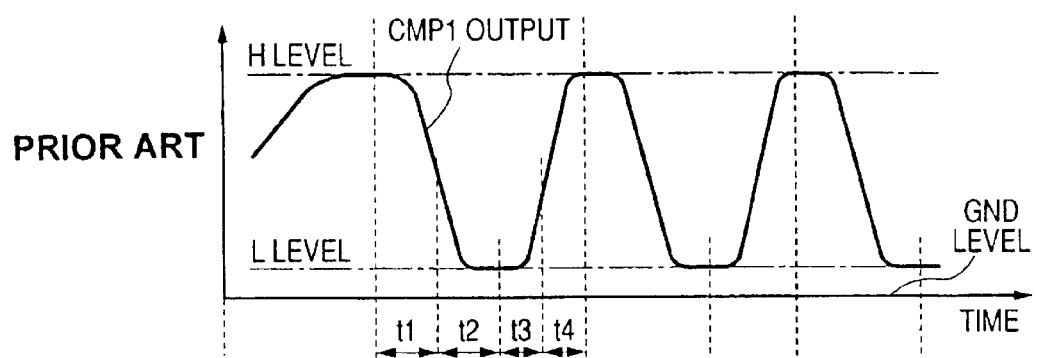
FIG. 8A to 8C are views explaining an ON/OFF operation of a current sensing circuit in the power-window jamming preventing apparatus in the related art.
Figure 8B:
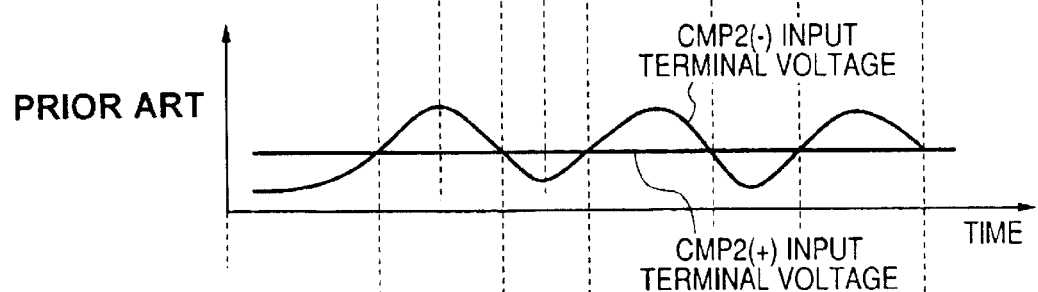
Figure 8C:
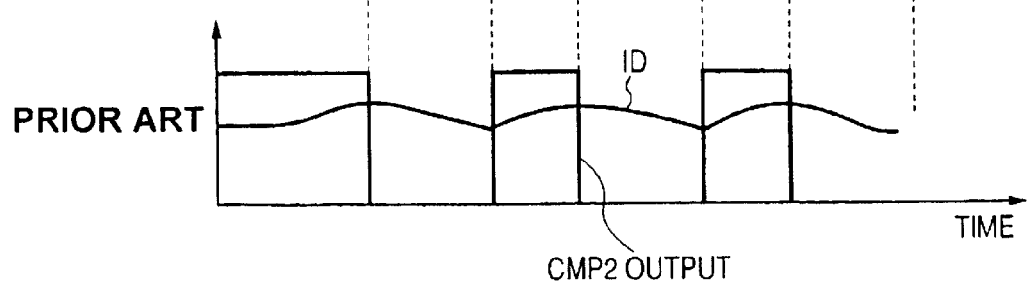
Figure 9:
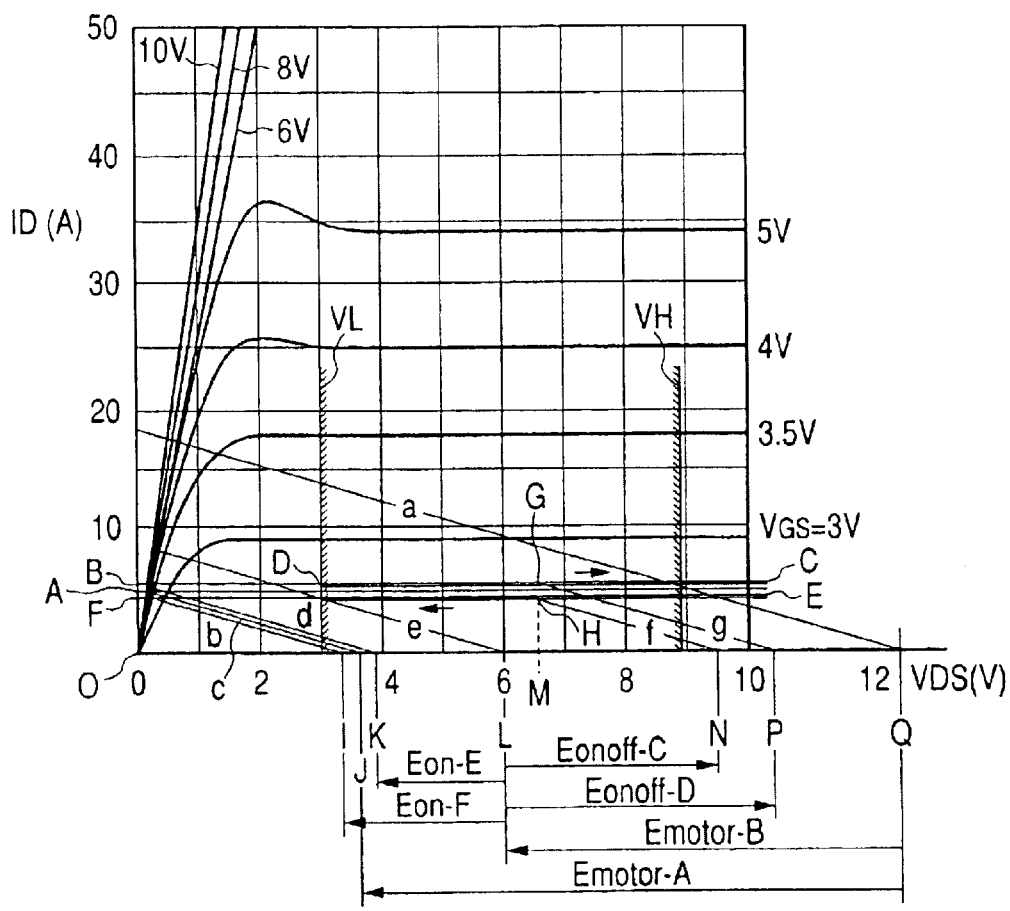
FIG. 9 is a static characteristic curve view explaining an operation of a semiconductor switching element in a current limiting circuit in the power-window jamming preventing apparatus in the related art, into which a load line is added.
Figure 10:
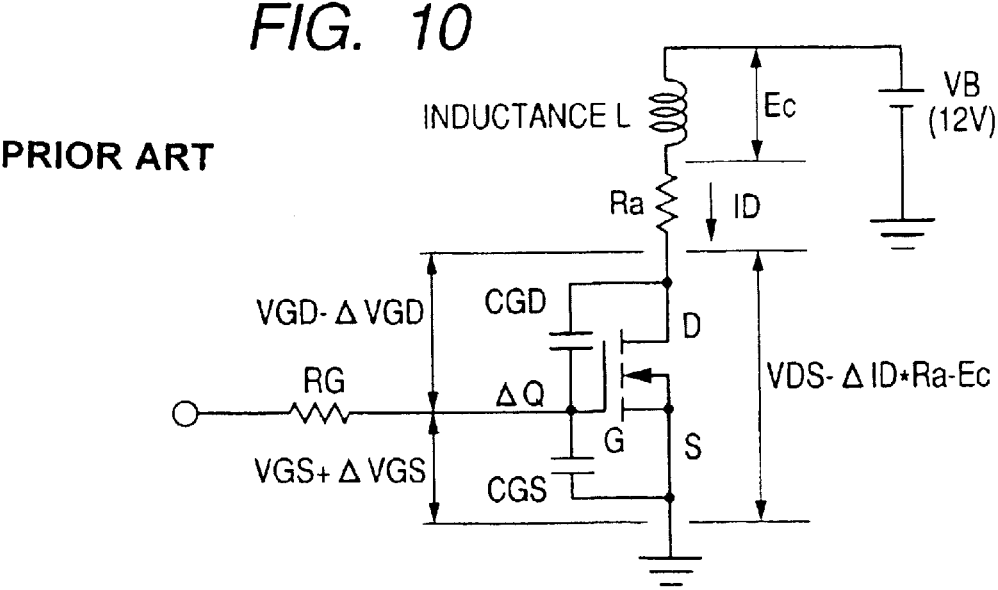
FIG. 10 is an equivalent circuit diagram explaining the operation of the semiconductor switching element in the current limiting circuit in the power-window jamming preventing apparatus in the related art.

A power window jamming preventing apparatus of the embodiment shown in FIG. 1 is provided with an example of a circuit modified by modifying the power window jamming preventing apparatus of FIG. 5 as shown by FIG. 6C as has already been explained and using a resistor in place of the diode D21 of the current sensing circuit 2. Specifically, according to the power window jamming preventing apparatus of the invention, the shunt resistor R1 and the reference resistor R20 of the current sensing circuit 2 previously shown by FIG. 7 are arranged on the low side (that is, ground side) of the power window motor 5, a circuit constitution of the current following circuit 3 of the current sensing circuit 2 is changed in accordance therewith and the circuit is further added with a motor current sensing range expanding circuit. Details of the motor current sensing range expanding circuit will be described later.

As shown by FIG. 1, the power window jamming preventing apparatus of the embodiment includes a current sensing circuit 2a for detecting an increase in the motor current ID flowing in the power window motor 5, the current limiting circuit 7 for reducing and increasing the motor current ID in a predetermined range in accordance with the current restriction control signal CPOUT_B outputted from the current sensing circuit 2a when the amount of increasing the motor current ID exceeds the predetermined value, and the jamming determining circuit 6 connected to the current limiting circuit 7 and the power window motor 5 for reversely rotating the power window motor 5 by determining jamming from an increase in the motor current ID. Further, constitutions of the power window motor 5, the jamming determining circuit 6 and the current limiting circuit 7 are substantially the same as the circuit constitutions of the power window determining preventing apparatus of FIG. 7.

The current sensing circuit 2a includes the shunt resistor R11 which is connected in series with the power window motor 5 and the current limiting circuit 7 and one end of which is connected to the minus terminal (ground terminal: ground) of the power supply apparatus VB for making the motor current ID flow, the reference resistor R20 which is provided with the resistance value of one n-th of that of the shunt resistor R1 and one end of which is connected to the minus terminal of the power source supply apparatus VB, a current following circuit 3a connected to other end of the reference resistor R20 for making a following current flow to the reference resistor 20 such that voltages respectively applied to the shunt resistor R1 and the reference resistor R20 become always equal to each other, the comparator (first comparator) CMP2 the plus input terminal and the minus input terminal of which are connected to the current following circuit 3a and the output terminal of which is connected to NOR1 (refer to FIG. 7) of the current limiting circuit 7, and the resistor R25 connected across the output terminals of the 5V power source and CMP2 for pulling up the current restriction control signal CPOUT_B.

The current following circuit 3a includes a following current limiting circuit for controlling the following current made to flow to the reference resistor R20 to be one n-th of the motor current ID (that is, the following current is made to flow to the reference current R20 such that the voltages respectively applied to the shunt resistor R1 and the reference resistor R20 can always be equal to each other). The following current control circuit includes a resistor R24 one end of which is connected to the wire 1, a resistor R27 one end of which is connected to other end of the resistor R24 and by which the plus input end of CMP2 is connected to a connecting line with the resistor R24, FET T22 provided between the resistor R27 and the reference resistor R20 such that a drain terminal thereof is connected to other end of the resistor R27 and a source terminal thereof is connected to other end of the reference resistor R20, an operational amplifier AMP1 a plus input terminal of which is connected to the source terminal of T22 and an output terminal of which is connected to a gate terminal of T22, a resistor R29 one end of which is connected to a minus input terminal of the operation amplifier AMP1 and other end of which is connected to other end of the shunt resistor R1, a resistor R23 one end of which is connected to the wire 1, a PNP type bipolar transistor T23 an emitter terminal of which is connected to other end of the resistor R23 and a collector terminal of which is connected to the source terminal of T22, and an operational amplifier AMP2 a minus input terminal of which is connected to the emitter terminal of T23, an output terminal of which is connected to a base terminal of T23 and a plus input terminal of which is connected to a minus input terminal of CMP2.

The operation amplifier AMP1 controls to apply a pertinent voltage from the output terminal to the gate terminal of T22 such that the current Iref-f is made to flow from T22 to the reference resistor R20 in accordance with an increase and a reduction of the motor current ID flowing to the shunt resistor R1. According to the control, when the motor current ID is increased, an input terminal voltage of AMP1 becomes high and therefore, a voltage applied from AMP1 to the gate terminal of T22 becomes high to make the current Iref-f flow to increase and when the motor current ID is conversely reduced, the input terminal voltage of AMP1 becomes low and therefore, the voltage applied to AMP1 and the gate terminal of T22 becomes low to reduce the current Iref-f.

The current following circuit 3a further includes the comparator CMP1 the minus input terminal of which is connected to the plus input terminal of the operational amplifier AMP2 and the plus input terminal of which is connected to the drain terminal of T22 (that is, other end of resistor of R27) and a charging and discharging circuit. The charging and discharging circuit includes a capacitor C1 one end of which is connected to the wire 1 and other end of which is connected to the minus input terminal of CMP1, a first current source AS1 which is connected in parallel with the capacitor C1 and an input side terminal of which is connected in parallel with the capacitor C1 and an input side terminal of which is connected to the wire 1, a semiconductor switch SSW1 connected to an output side terminal of the current source A1 for operating to ON/OFF in accordance with an output of CMP1, and a second current source A2 an input side terminal of which is connected to the semiconductor switch SSW1 and an output side terminal of which is connected to the minus terminal of the power supply apparatus VB.

According to the current following circuit 3a, a first reference voltage Vc2 which is a potential of the drain terminal T22 (that is, other end of the resistor R27) is applied to the plus input terminal of the comparator CMP1. Further, a second reference voltage Vc is generated by charging and discharging the capacitor C1 by being controlled to be an average value of the first reference voltage Vc2 and applied to the minus input terminal of CMP1 and the minus input terminal of CMP2. Further, a third reference voltage Vins applied to the plus input terminal of CMP2 shows a voltage value higher than that of Vc2 by an amount of the resistor R27.

Since a current value of the current Iref-s is constituted by dividing a voltage applied across both ends of the resistor R23 (that is, a difference voltage between a potential of the wire 1 and Vc by a resistance value of the resistor R23, the operational amplifier AMP2 controls T23 such that the current Iref-s is made to flow to the resistor R23 by applying a pertinent voltage from the output end to the base terminal of T23. According to the control, when the motor current ID is increased, the input terminal voltage (Vc) of AMP2 to the base terminal of T23 becomes low to make the current Iref-f flow to increase and when the motor current ID is conversely reduced, the input terminal voltage (Vc) of AMP2 becomes high and therefore, the voltage applied from AMP2 to the base terminal of T23 becomes high to reduce the current Iref-f.

The reference current Iref flowing in the reference resistor R20 is a total of the current Iref-f flowing in the resistor R24 and the resistor R27 and the current Iref-s flowing in the resistor R23 and is a current in correspondence with one several thousandth to several tens thousandth of the motor current ID similar to the case of the circuit constitution of FIG. 7 and is pulsated similar to the motor current ID. The third reference voltage Vins indicates a potential between the resistor R24 and the resistor R27, a potential subjected to voltage drop by a certain value from Vins by the resistor R27 is Vc2 and therefore, Vc2 is also pulsated similar to Vins.

According to the power window jamming preventing apparatus shown in FIG. 1, when the motor current ID is rapidly increased by bringing about jamming, the plus input terminal voltage (that is, the third reference voltage Vins) of CMP2 indicating an instantaneous value of the motor current ID and the minus input voltage (Vc) generated by charging and discharging the capacitor C1 cross each other and the output (CPOUT_B) of CMP2 is changed from H level to L level during a time period of crossing. Further, when CPOUT_B becomes L level, in the current limiting circuit 7, the semiconductor switching element T1 (refer to FIG. 7) is controlled to On/Off, a number of times of On/Off during a time period of operating to On/Off is counted by the jamming determining circuit 6 based on a number of times of rise of the output level of CMP3 (refer to FIG. 7) of the current limiting circuit 7 and when the number reaches a constant value (for example, 16 pulses), jamming is determined.

Meanwhile, according to the power window jamming preventing apparatus of FIG. 1, the motor current ID is always increased in a state in which the window glass is always applied with a heavy load by increasing friction particularly at low temperature time or by an aging change or the like or a state in which the output voltage of the power source supply apparatus VB is lowered and therefore, there is brought about a state in which a signal voltage in the circuit is lowered to be equal to or lower than voltage input ranges of AMP1 and CMP1 and outputs thereof become unstable. The ratio of the current sensing circuit comprising the shunt resistor R1 and the reference resistor R20 (for example, when R20 is 20 mΩ and R1 is 300 Ω, 20 mΩ/300Ω=1/15000) is fixed and therefore, when the signal voltage in the circuit is lowered, the range of capable of controlling when the motor current ID is increased is restricted.

Therefore, the power window jamming preventing apparatus of the invention is provided with a motor current sensing range expanding circuit 3b. The motor current sensing range expanding circuit 3b includes a motor current sensing range expanding resistor R220 (second resistor) one end of which is connected to the minus input terminal of AMP1, FET T60 (second semiconductor switch) a drain terminal of which is connected to other end of the resistor R220 and a source terminal of which is connected to the ground terminal of the power supply apparatus, a (second comparator) comparator CMP5 a plus input terminal of which is applied with the first reference voltage Vc2 and a minus input terminal of which is applied with a comparing voltage Vcmp indicating that the voltage is equal to or larger than voltage input ranges of AMP1 and CMP1 or the like, a resistor R221 one end of which is connected to the plus terminal of the power supply apparatus and other end of which is connected to an output end of the comparator CMP5, a digital filter FIL an inverted input side terminal of which is connected to the output end of the comparator CMP5 for removing an amount of an instantaneous change of an output of the comparator CMP5, and a latch LAT an input side terminal of which is connected to an output side terminal of the digital filter FIL for making T60 On by latching the output of the comparator CMP 5 outputted from digital filter FIL when the first reference voltage Vc2 becomes equal to or lower than the comparing voltage Vcmp for a constant period of time, and by making T60 On, the resistor R220 is added to the following current control circuit and the ratio of the current sensing circuit comprising the shunt resistor R1 and the reference resistor R20 is increased to thereby expand a jamming detectable range.

Figure 2:
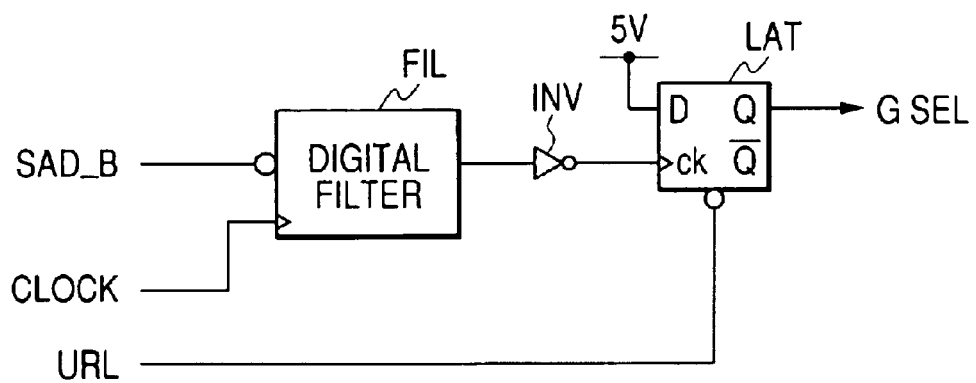
FIG. 2 is a block diagram showing a relationship of connecting a digital filter and a latch of a motor current sensing range expanding circuit of the power window jamming preventing apparatus of FIG. 1.

An FF (flip-flop) of, for example, D type is used for the latch LAT as shown by FIG. 2 and the D type FF stores a value (in this case, 5V) of a D signal at rise of a clock signal (in this case, the output of the digital filter FIL) to output from a Q terminal. A latched state can be released by inputting a reset signal (URL signal in the diagram) to a reset input terminal. Since an output of the digital filter FIL is active Low and therefore, an inverter INV is interposed between an output end of the digital filter FIL and a clock signal input end of the latch LAT.

Figure 3:
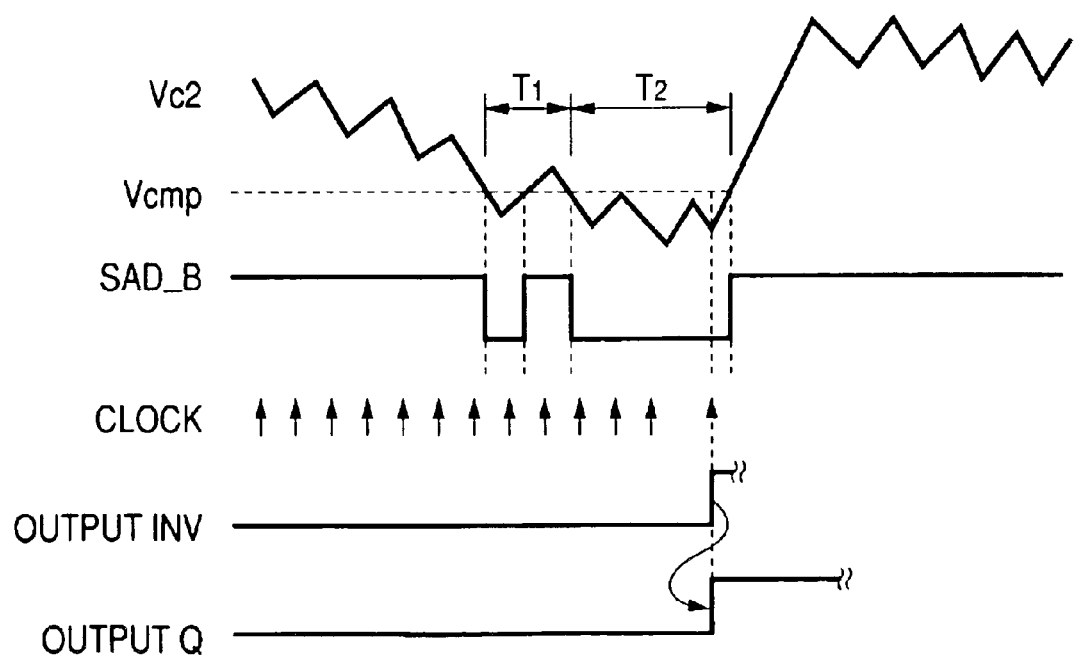
FIG. 3 is a waveform diagram for explaining operation of the digital filter and the latch of the motor current sensing range expanding circuit of the power window jamming preventing apparatus of FIG. 1.

The digital filter FIL is a so-to-speak low pass filter and used for removing the amount of the instantaneous change of the output of CMP5 when the first reference voltage Vc2 becomes equal to or lower than the comparing voltage Vcmp for a short period of time. That is, as shown by, for example, FIG. 3, when the first reference voltage Vc2 becomes equal to or lower than comparing voltage Vcmp in a comparatively short time period (time period T1), the change in the output of CMP5 becomes instantaneous and therefore, the output of the digital filter FIL does not become L level and when the first reference voltage Vc2 becomes equal to or lower than the comparing voltage Vcmp for a comparatively long time period as shown by a time period T2, the output of the digital filter FIL becomes L level. Further, at a timing at which the output of the digital filter FIL become L level, the output of the inverter INV become H level and the Q output of the latch LAT becomes H level.

Figure 4:
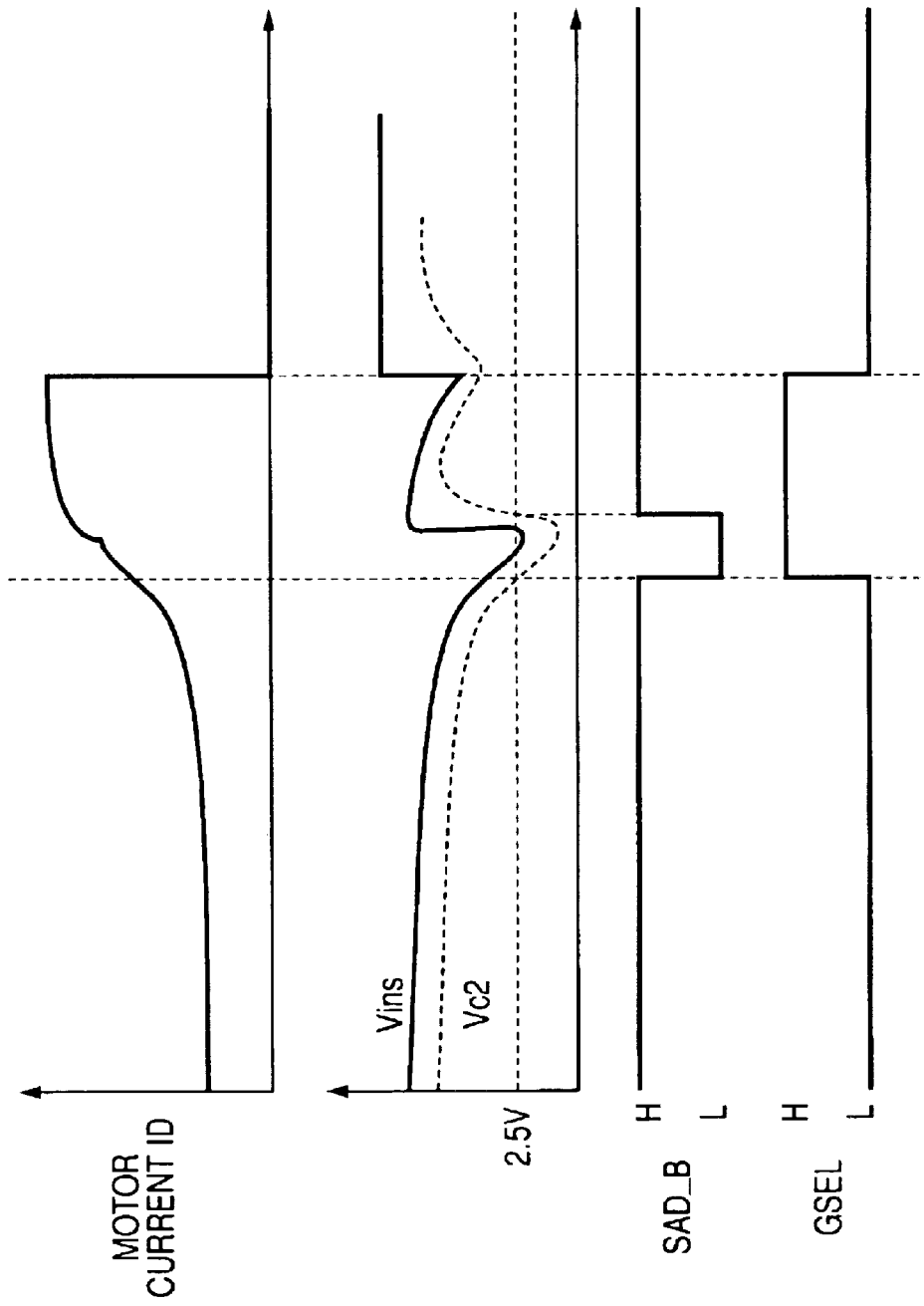
FIG. 4 is a waveform diagram for explaining operation of expanding a motor current sensing range in the power window jamming preventing apparatus of FIG. 1.

Operation of the motor current sensing range expanding circuit 3b is shown by using a relationship among the motor current ID, the second reference voltage Vc, the third reference voltage Vins, an output (SAD_B) of the comparator CMP5 and an output (GSEL) of the latch LAT in FIG. 4. In this case, a lower limit of a voltage input range of AMP1, CMP1 or the like is set to 2.5V and the voltage is applied to the minus input terminal CMP5 as the comparing voltage Vcmp.

Since the first reference voltage Vc2 includes a pulsating component of the motor current ID, when the motor current ID is not changed, Vc=Vc2 established and when the motor current ID is increased, Vc>Vc2 and when the motor current ID is reduced, Vc<Vc2. A difference between the second reference voltage Vc and the first reference voltage Vc2 is proportional to a difference between Vc and Vins (the voltage higher than Vc2 by an amount of the voltage effect of R27).

When the motor current ID is increased by bringing about jamming and Vc2 becomes equal to or lower than 2.5V, in accordance with the signal SAD_B at L level outputted from CMP5, the output of the digital filter FIL become L level and at the timing, the output of the inverter INV becomes H level to be maintained at the latch LAT. The H level output (GESL) of the latch LAT is applied to the gate of T60 to make T60 On, thereby, the motor current sensing range expanding resistor R220 is interposed to the following current control circuit and the ratio of the current sensing circuit comprising the shunt resistor R1 and the reference resistor R20 is increased. Thereby, an amplification factor of AMP1 is reduced, a voltage varying width of the third reference voltage Vins is reduced in accordance therewith to thereby bring about a state of capable of controlling jamming. That is, even in a state in which the window glass is always applied with a heavy load by increasing friction at the low temperature time or by the ageing change or the like or a state in which the output voltage of the power supply apparatus VB is lowered, by expanding the jamming detectable range, incapacitance of detecting jamming can be avoided.

Further, the invention is not limited to the above-described embodiment but can pertinently be modified or improved. Otherwise, modes, numbers, locations of arranging and the like of respective constituent elements and numerical values, waveforms and the like in the above-described embodiment are arbitrary and not limited so far as the invention can be achieved thereby.

What is claimed is:

1. A power-window jamming preventing apparatus, comprising;
   a current sensing circuit, which senses a motor current flowing through a motor for driving a window glass;
   a current limiting circuit, which increases and decreases the motor current based on a current limitation control signal outputted from the current sensing circuit when an amount of increase of the motor current exceeds a predetermined vale; and
   a jamming determining circuit, which determines a jamming of a foreign matter in the window glass based on increase of the motor current to reverse a rotation of the motor,
   wherein the current sensing circuit includes;
      a shunt resistor, on which the motor current is flown;
      a reference resistor, which has a resistance value that is n times the shunt resistor; and
      a current following circuit, which increases and decreases a following current flowing through the reference resistor so that voltages respectively applied to the shunt resistor and the reference resistor become always equal to each other;
   wherein the current following circuit includes:
      a following current control circuit, which controls the following current so as to be one n-th of the motor current, and generates a first reference voltage having a pulsating component of the motor current; and
      a capacitor, which generates a second reference voltage indicating an average value of the first reference voltage by charging and discharging; and
   wherein the current sensing circuit includes a first comparator which compares a third reference voltage higher than the first reference voltage with the second reference voltage, and outputs the current limitation control signal based on a comparison result thereof, the apparatus further comprising, a motor current sensing range expanding circuit, which expands a motor current sensing range by increasing a ratio of the current sensing circuit having the shunt resistor and the reference resistor when the first reference voltage becomes equal to or lower than a comparing voltage indicating a voltage input range of an active element of the following current control circuit and the state of the first reference voltage and the comparing voltage continues for a constant period of time.

2. The apparatus as set forth in claim 1, wherein the motor current sensing range expanding circuit includes:

a resistor, which is connected to the shunt resistor;

a semiconductor switch, which is connected to the resistor; and a second comparator, which compares the first reference voltage with the comparing voltage;

wherein the semiconductor switch is turned on in accordance with an output of the second comparator when the first reference voltage becomes equal to or lower than the comparing voltage for a constant period of time; and wherein when the semiconductor switch is turned on, the second resistor is added to the following current control circuit so that the ratio of the current detecting circuit is increased by adding of the resistor for expanding a jamming detectable range.

3. The apparatus as set forth in claim 2, wherein the motor current sensing range expanding circuit includes a digital filter, which is provided between the second comparator and the semiconductor switch, and removes an instantaneous change of the output of the second comparator.

* * * * *